United States Patent Office 3,405,137
Patented Oct. 8, 1968

---

3,405,137
PHOTOCHROMIC DICYANO-DIHYDRO-DIBENZO-FURANS AND DIBENZOTHIOPHENES
Joseph Csapilla, Stamford, Conn., assignor to American Cyanamid Company, Stamford, Conn., a corporation of Maine
No Drawing. Filed May 17, 1966, Ser. No. 550,594
9 Claims. (Cl. 260—329.3)

---

ABSTRACT OF THE DISCLOSURE 1,4 - substituted-2,2-dicyano-1,2-dihydro-dibenzofurans and the corresponding dibenzothiophenes are provided. They are made by reductive cyclization of the corresponding 3-[3-(benzoyl)-2-benzofuryl or benzothiophenyl]-3-phenyl-1-propene-1,1-dicarbonitrile with a metal alkoxide. The final products exhibit photochromism and are therefore useful in the manufacture of articles such as sunglasses and windows.

---

This invention relates to photochromic cyclohexadiene compounds of the formula

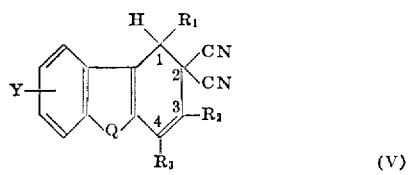

(V)

where Y is hydrogen, lower alkyl, trifluoromethyl, lower alkoxy, lower alkyl thio, cyano, nitro, halogen, di(lower alkyl)amino, phenyl, or lower alkyl-substituted phenyl; Q is oxygen or sulfur; $R_1$ and $R_3$ are phenyl or substituted phenyl wherein the substituents (one or more) are lower alkyl, lower alkoxy, lower alkyl thio, cyano, nitro, di(lower alkyl)amino, halogen, or trifluoromethyl; and $R_2$ is hydrogen, cyano, lower alkyl, phenyl or para-di (lower alkyl)amino phenyl, including compounds wherein Y, $R_1$, $R_2$ and $R_3$ are identical or different. By "lower" is meant 1 to 8 carbon atoms, inclusive.

These compounds are prepared by reductive cyclization as follows where $R_4$ and $R_5$ are hydrogen, alkyl or aryl, M is a metal atom, and the other substituents are as defined above:

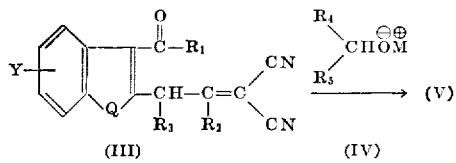

Intermediate (III) is prepared in a known manner by reaction of a known benzo[b]furan or benzol[b]thiophene in a non-aqueous strongly basic medium with a known cyanoethylene compound as follows where Y, Q, $R_1$, $R_2$ and $R_3$ are as defined above and X is a leaving group, i.e., one which does not become a part of the product, e.g., halogen, alkoxy, phenoxy, sulfonoxy, cyano, and the like:

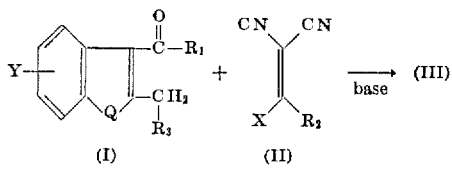

Typical cyanoethylenes (II) are monohalo di- and tri-cyanoethylene, ethoxymethylenemalonitrile, and tetracyanoethylene and typical bases are sodium hydride, sodium triphenylmethide, alkali metal dialkyl amides such as lithium diethylamide and lithium dipropylamide, and the like. Suitable inert, nonaqueous solvents for the reaction include tetrahydrofuran, dioxane, dimethylsulfoxide, glyme, diglyme, and the like. The reactants are employed in substantially stoichiometric amounts although a slight excess of the cyanoethylene is preferred. Reflux conditions are preferred but are not critical.

The starting benzo[b]furan or benzo[b]thiophene compounds (I) may be prepared in accordance with the procedure disclosed in U.S. patent application Ser. No. 418,336 filed Dec. 14, 1964 by Kenneth Robert Huffman and Edwin Fisher Ullman. The subject matter of this application is incorporated herein by reference.

In the preparation of the compounds (V) of the present invention from intermediate (III), reactant (IV) is a metal alkoxide containing at least one hydrogen atom on the alpha carbon atom and wherein $R_4$ and $R_5$ are hydrogen, alkyl, preferably lower alkyl ($C_1$–$C_8$), or aryl, preferably phenyl or naphthyl. $R_4$ and $R_5$ may be the same or different. M is a metal atom, preferably an alkali metal such as potassium, lithium, or sodium, but also an alkaline earth metal such as magnesium, or others such as aluminum. Reactant (IV) is a reducing agent and serves to reduce the carbonyl function of (III) to

at position 1 of product (V). The reactivity of reactant (IV) is therefore a result primarily of the presence of at least one hydrogen atom on the alpha carbon atom and the character of $R_4$, $R_5$ and M is not critical. Representative of reactant (IV) are sodium ethoxide, sodium isopropoxide, sodium salt of benzyl alcohol and the like. Sodium isopropoxide is preferred. Alkoxide reducing agent (IV) may be employed as such but more conveniently is generated in situ by mixing a metal hydride with the proper alcohol. To this solution is added a solution of intermediate (III) in an inert solvent such as tetrahydrofuran, dioxane, diethyl ether, benzene, toluene, or the alcohol used to form the metal alkoxide, e.g., isopropanol.

An excess of alkoxide (IV) over the equimolar amount required for reaction with intermediate (III) is employed provided that when more than 4 moles of alkoxide are employed per mole intermediate (III), the reaction time should be correspondingly shorter to prevent degradation of product (V) by HCN elimination. Keeping this caution in mind, from about 1.01 to 20 moles of alkoxide (IV) may be employed per mole of intermediate (III), preferably 2 to 4 moles per mole of intermediate. Generally the reaction is carried out in a non-aqueous medium at from about −40° C. to 95° C., preferably 0° C. to 65° C., depending upon the reflux temperature of the reaction mixture and pressure which may be atmospheric, sub-atmospheric, or super-atmospheric. Reaction is conducted to substantial completion which may be achieved in about 30 minutes to 4 hours. Excessive refluxing should be avoided as this promotes degradation of product (V).

The reaction is conveniently conducted in the absence of atmospheric moisture and product (V) is separated by known techniques including extraction with ether, crystallization, chromatography, and filtration.

The compounds of the invention exhibit photochromism and are therefore useful in the manufacture of articles such as sunglasses, novelty toys, and variable transmission devices such as windows, photocopying machines and materials, optical masks, and the like. For example, films containing a compound of the invention may be prepared by dissolving the compound in a suitable solvent such as benzene and incorporating this solution in a thermoplastic polymer composition e.g., a 20% by weights solids solution, based on dry weight of additives, with polymethylmethacrylate (95% polymer and 5% photochromic compound). A substrate, such as polyester film, when coated with the polymer composition is useful as an optical mask or memory tape.

The following examples further illustrate the invention but are not limitative thereof except as indicated in the appended claims. All parts and percentages are by weight unless otherwise specified.

EXAMPLE 1

(A) Preparation of 3-[3-(o-methoxybenzoyl)-2-benzofuranyl]-3-phenyl-1-propene-1,1-dicarbonitrile (III)

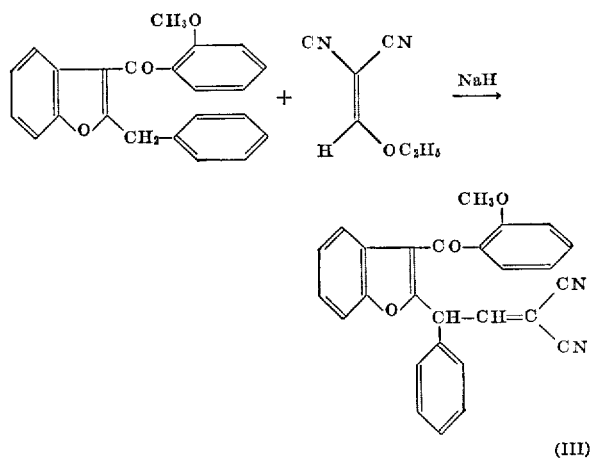

To 1.0 gram of sodium hydride (55% in mineral oil), stirred in 10 milliliters of dry tetrahydrofuran, is added dropwise a solution of 0.0100 mole (3.42 grams) of the 3-(o-methoxybenzoyl)-2-benzylbenzofuran in 20 milliliters of dry tetrahydrofuran. Excess sodium hydride has no effect on the reaction. Sodium hydride, sodium amide, butyl lithium, sodium methoxide, potassium tertiary-butoxide, and the like can also be employed as bases. The entire reaction mixture is kept under a nitrogen atmosphere. The resulting deep red solution is refluxed for 30 minutes (salt-formation is complete after a few minutes of refluxing), cooled to 0° C., then treated with 0.011 mole (1.35 grams) of ethoxymethylenemalonitrile, and kept at 0° for 15 minutes. Two milliliters of glacial acetic acid are added dropwise to destroy the excess sodium hydride. The sodium hydride can also be destroyed by other hydroxylic solvents such as water, alcohols and organic acids. Thereafter, about ⅔ of the solvent is removed on the steam bath while nitrogen is bubbled through the reaction mixture. The residue is taken up in aqueous sodium carbonate solution and ether. The ether extract contains the unreacted starting materials, the mineral oil and the non-acidic by-products. The alkaline solution is separated and acidified with 2 N HCl and then extracted with methylene chloride. The oily residue (3.7 grams; 89%) is purified by chromatography or silca gel. The proposed structure is consistent with the infrared spectrum of the purified sample.

(B) Preparation of 1-(o-methoxyphenyl)-4-phenyl-2,2(1H)-dibenzofurandicarbonitrile

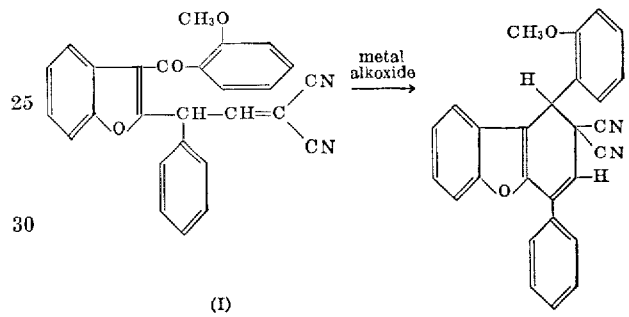

The product of Part (A), 2.2 grams, is dissolved in 10 milliliters of dry tetrahydrofuran, and added dropwise at 0° C. to a sodium iso-propoxide solution made from 0.50 gram of sodium hydride (55% in mineral oil) and 5 milliliters of iso-propanol in 10 milliliters of tetrahydrofuran. The apparatus is equipped to exclude atmospheric moisture. The resulting deep red solution is refluxed for two hours, cooled to 0° C., diluted with 150 milliliters of water and extracted with ether. The ether extract contains the mineral oil and the non-acidic by-products. The water solution is acidified with 2 N HCl and again extracted with ether. The oily residue from the second extraction is dissolved in 20 milliliters of methanol and kept at 0° for two days. The crystals are collected on a filter and washed with methanol. After one recrystallization from ether/methanol, the melting point reaches its maximum (M.P. 195–7° C.).

EXAMPLES 2–27

Substantially in accordance with the procedure of Example 1 with the exceptions indicated other photochromic compounds of the invention are prepared. Representative reactants, conditions and products are shown in Table I below.

TABLE I

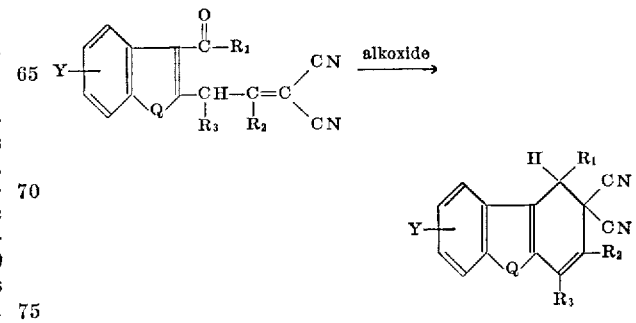

| Example | Y | Q | R₁ | R₂ | R₃ | Reducing Agent | Solvent |
|---|---|---|---|---|---|---|---|
| 2 | H | O | 2,3-dimethoxyphenyl | H | Phenyl | Aluminum isopropoxide | Isopropanol. |
| 3 | H | O | o-Fluorophenyl | H | do | Sodium isopropoxide | Tetrahydrofuran |
| 4 | H | O | 2,4-dimethoxyphenyl | H | do | Sodium ethoxide | Do. |
| 5 | H | O | o-Methoxyphenyl | H | 4-cyanophenyl | Sodium methoxide | Do. |
| 6 | H | O | 2,6-dimethoxyphenyl | H | Phenyl | do | Do. |
| 7 | H | O | p-Methoxyphenyl | H | do | do | Do. |
| 8 | H | O | p-Fluorophenyl | H | do | Sodium isopropoxide | Isopropanol. |
| 9 | H | O | o-Methoxyphenyl | H | do | do | Do. |
| 10 | H | O | do | Ethyl | do | do | Do. |
| 11 | H | O | do | Methyl | p-Trifluoromethylphenyl | do | Do. |
| 12 | 6-Br | O | do | H | p-Nitrophenyl | do | Do. |
| 13 | C₂H₅ | O | do | H | Phenyl | do | Do. |
| 14 | 4-CN | O | do | 4-dimethylaminophenyl | 2-Cyanophenyl | do | Do. |
| 15 | 4-CN | S | m-Bromophenyl | H | Phenyl | do | Do. |
| 16 | 6-SCH₃ | S | 2-cyanophenyl | H | m-Bromophenyl | do | Do. |
| 17 | H | S | o-Methoxyphenyl | H | Phenyl | do | Do. |
| 18 | H | S | p-fluorophenyl | H | do | do | Do. |
| 19 | 5-NO₂ | O | 4-dimethylaminophenyl | H | 4-cyanophenyl | do | Do. |
| 20 | 6-CF₃ | O | o-Methoxyphenyl | Phenyl | Phenyl | do | Do. |
| 21 | H | S | do | Methyl | 4-cyanophenyl | do | Do. |
| 22 | 5-NH₂ | O | do | H | Phenyl | do | Do. |
| 23 | 4-OH | O | p-Methylphenyl | Cyano | do | do | Do. |
| 24 | 2-OCH₃ | O | o-Methylthiophenyl | H | do | do | Do. |
| 25 | 4-C₆H₅ | S | do | Ethyl | do | do | Do. |
| 26 | 4-(CH₃)₂N— | O | do | Isopropyl | do | Sodium ethoxide | Tetrahydrofuran |
| 27 | 4-CH₃C₆H₄— | S | do | t-Butyl | do | do | Do. |

I claim:
1. Photochromic compounds of the formula

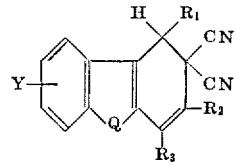

where Y is hydrogen, alkyl, trifluoromethyl, lower alkoxy, lower alkyl thio, cyano, nitro, halogen, di- lower-alkylaminophenyl, phenyl, or lower-alkyl-substituted phenyl; Q is oxygen or sulfur; $R_1$ and $R_3$ are phenyl or substituted phenyl wherein the substituents are lower-alkyl, lower-alkoxy, lower-alkyl thio, cyano, nitro, di-lower alkyl-amino, halogen, or trifluoromethyl; and $R_2$ is hydrogen, cyano, lower-alkyl, phenyl, or para-di-lower-alkyl-amino phenyl.

2. The compound of claim 1 wherein Y is hydrogen, Q is oxygen, $R_2$ is hydrogen, and $R_3$ is phenyl.

3. The compound of claim 2 wherein $R_1$ is o-methoxyphenyl.

4. The compound of claim 2 wherein $R_1$ is o-fluorophenyl.

5. The compound of claim 2 wherein $R_1$ is 2,3-dimethoxyphenyl.

6. The compound of claim 2 wherein $R_1$ is 2,4-dimethoxyphenyl.

7. The compound of claim 2 wherein $R_1$ is p-methoxyphenyl.

8. A process for preparing the compounds of claim 1 naphthyl and M is a metal, a compound of the formula

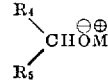

where $R_4$ and $R_5$ are hydrogen, lower-alkyl phenyl or naphthyl and M is a metal, a compound of the formula

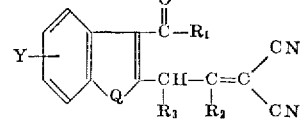

where Y, Q, $R_1$, $R_2$ and $R_3$ are defined in claim 1.

9. The process of claim 8 wherein said alkoxide is sodium isopropoxide.

References Cited
UNITED STATES PATENTS 3,331,854  7/1967  Huffman et al. ____ 260—330.5

NICHOLAS S. RIZZO, *Primary Examiner.*

B. I. DENTZ, *Assistant Examiner.*

UNITED STATES PATENT OFFICE
CERTIFICATE OF CORRECTION

Patent No. 3,405,137                                                  October 8, 1968

Joseph Csapilla

It is certified that error appears in the above identified patent and that said Letters Patent are hereby corrected as shown below:

Column 6, beginning with "8. A process" cancel all to and including Claim 1. in line 41, same column 6, and insert:

8. A process for preparing the compounds of Claim 1 which comprises reacting with an alkoxide of the formula

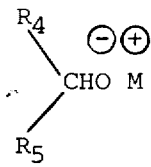

where $R_4$ and $R_5$ are hydrogen, lower alkyl phenyl or naphthyl and M is a metal, a compound of the formula

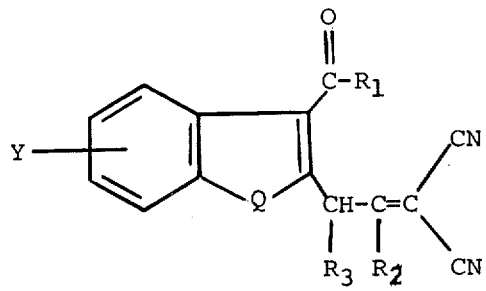

where Y, Q, $R_1$, $R_2$ and $R_3$ are as defined in Claim 1.

Signed and sealed this 17th day of March 1970.

(SEAL)
Attest:

EDWARD M. FLETCHER, JR.                            WILLIAM E. SCHUYLER, JR.
Attesting Officer                                            Commissioner of Patents